United States Patent [19]

Spengler

[11] 4,131,720
[45] Dec. 26, 1978

[54] HEAVY-DUTY HEAT-RESPONSIVE BIMETALLIC MATERIAL

[75] Inventor: Heinz Spengler, Pforzheim, Germany

[73] Assignee: G. Rau, Pforzheim, Germany

[21] Appl. No.: 778,320

[22] Filed: Mar. 16, 1977

[30] Foreign Application Priority Data

Apr. 1, 1976 [DE] Fed. Rep. of Germany ....... 2613954

[51] Int. Cl.² ............................................. B32B 15/18
[52] U.S. Cl. ..................................... 428/619; 428/616; 428/682
[58] Field of Search ............... 428/616, 617, 619, 679, 428/682, 683; 75/170, 122, 134 F, 128 R, 123 K, 123 M, 124

[56] References Cited

U.S. PATENT DOCUMENTS

| | | | |
|---|---|---|---|
| 1,993,020 | 3/1935 | Scott | 428/619 |
| 2,578,197 | 12/1951 | Mudge | 428/619 |
| 2,941,882 | 6/1960 | Franklin et al. | 75/123 K |
| 3,102,793 | 9/1963 | Alban | 428/617 |
| 3,847,685 | 11/1974 | Baboian | 428/619 |
| 3,971,677 | 7/1976 | Mason et al. | 78/122 |

FOREIGN PATENT DOCUMENTS

327572 4/1978 Austria.
930569 7/1963 United Kingdom ..................... 428/619

*Primary Examiner*—Arthur J. Steiner
*Attorney, Agent, or Firm*—Wenderoth, Lind & Ponack

[57] ABSTRACT

The bimetallic material comprises a laminate of two materials, one having a high coefficient of thermal expansion, one with a low coefficient of thermal expansion. The material with the high coefficient of expansion is a corrosion resisting and heat resisting austenitic chromium-nickel steel, while the material with the low coefficient of expansion is a heat hardenable alloy of iron, nickel, cobalt and titanium and/or aluminium. It is found that this combination of materials gives rise to a bimetallic material capable of heavy duty applications without the disadvantages normally associated with such heavy duty materials.

4 Claims, 1 Drawing Figure

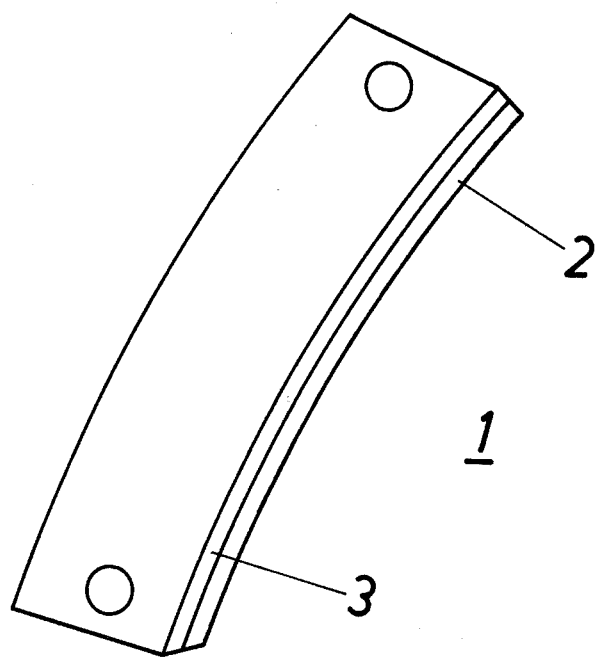

HEAVY-DUTY HEAT-RESPONSIVE BIMETALLIC MATERIAL

This invention relates to a heavy-duty heat-responsive bimetallic material of the type comprising at least one metallic component of material having a high coefficient of thermal expansion which is joined to a further metallic component of material having a low coefficient of thermal expansion. A method of producing such a heat-responsive bimetallic material is also disclosed.

Heat responsive bimetallic materials consist of at least two metallic components each having a different coefficient of thermal expansion, which are joined together in an inseparable manner. Because of this difference in expansion coefficient, curvature occurs in one or more planes when the temperature of the material is raised, and the amount of curvature of the bimetallic material is known as the "specific thermal deflection". In the case of known heat-responsive bimetallic materials, this lies between 5 and $23 \cdot 10^{-6}$/K. An important property of the bimetallic material is its "duty limit", i.e. the temperature at which the bimetallic materials, cold-shaped in the usual manner, begin to soften. As the duty limit is increasingly exceeded, the bimetallic function is interfered with or completely destroyed by the deformation and progressive softening of the material that occur.

In many cases where heat-responsive bimetallic materials are used to form inexpensive measuring or control elements, higher duty limits are required than those provided by the commercially available bimetallic materials. In German Pat. No. 1,110,193, there is described a heat-responsive bimetallic material which has a duty limit of up to 600° C. and the high thermal expansion component of which is an iron-nickel-chromium alloy containing 43–48% by weight of nickel, 20–26% by weight of chromium and the remainder iron, whereas its low thermal expansion component is an iron-chromium-copper alloy having 20–25% by weight of chromium and 0.3–2.5% by weight of copper. However such known bimetallic material does not offer any appreciable advantages over the commercially available materials, since its high resistance to temperature is accompanied by an unacceptably low specific thermal deflection of only $3.5 \cdot 10^{-6}$/K. Furthermore, with increase in the temperature to which it is subjected, this known bimetallic material exhibits a very considerable decrease in the bending resilience that enables its force effect to be utilized.

The present invention seeks to provide a heat-responsive bimetallic material which combines a good specific thermal deflection with a high duty limit, which may be set during its manufacture, and with high strength.

According to a first aspect of the invention, there is provided a heavy duty heat-responsive bimetallic material comprising at least one metallic component of material having a high coefficient of thermal expansion which is joined to a further metallic component of material having a relatively low coefficient of thermal expansion, and wherein the material having the high coefficient of thermal expansion is a corrosion-resisting and heat-resisting austenitic chromium-nickel steel, and the material having the relatively low coefficient of thermal expansion is a heat-hardenable alloy of iron, nickel, cobalt and titanium and/or aluminium.

Advantageously, the material having the high coefficient of thermal expansion is a chromium-nickel steel containing 14–26% by weight of chromium and 6–36% by weight of nickel with or without further additions of molybdenum, niobium, titanium and silicon, the rest being iron and melt impurities, while the material having the relatively low coefficient of thermal expansion, is either a heat-hardenable iron-nickel-titanium alloy having 30–55% by weight of nickel, 1–5% by weight of free titanium, the remainder being iron and melt impurities, or an iron-nickel-cobalt-titanium alloy having 26–39% by weight of nickel, 3–16% by weight of cobalt, 1–5% by weight of free titanium, the remainder being iron and melt impurities. In one embodiment, the material having the high coefficient of thermal expansion is a chromium-nickel steel having 18% by weight of chromium and 8% by weight of nickel, the remainder being iron, and the material having the low coefficient of thermal expansion is a thermally hardenable iron-nickel-cobalt-titanium alloy containing 34% by weight of nickel, 6% by weight of cobalt, 1.5% by weight of free titanium and up to 0.03% by weight of carbon, the remainder being iron.

The material having the relatively low coefficient of thermal expansion may advantageously also contain additions of chromium, molybdenum, tungsten, niobium and tantalum, and in some circumstances it is advantageous to replace all or some of the free titanium content by aluminium.

A heat-responsive bimetallic material consisting of the above-stated components can have a good specific thermal deflection of $8$–$12 \cdot 10^{-6}$K. A duty limit, adjustable over the range 600° to 750° C., can be imparted to the material by a thermal hardening treatment of the material having the relatively low coefficient of thermal expansion, and at the same time the bimetallic material exhibits good strength.

In accordance with a second aspect of the invention, there is provided a method of producing the bimetallic material according to the first aspect of the invention, said method comprising cladding together said components by rolling, to form a semi-finished product subjecting the semi-finished product to multi pass cold-rolling, the final cold-rolling pass reduction being 20–30%, shaping the cold-rolled semi-finished product to the required shape, and subjecting the shaped product to heat treatment in order to fix the duty limit.

An advantageous method of producing the bimetallic material includes annealing at 800°–1200° C. between cold rolling pass reductions. From this semi-finished product, which has good cold-shaping properties, can be produced shaped bimetallic parts in the form of strips, discs or other shapes suitable for particular applications. Advantageously, the strength and duty limit of these shaped parts are not adjusted until the parts are ready to be fitted, the adjustment being made by combining the usual ageing treatment of the bimetallic material prior to fitting with the hardening heat-treatment of the material having the low coefficient of thermal expansion. In known methods, the ageing of the bimetallic parts, which is carried out over a period of approximately 1–3 hours at temperatures in the recrystallization range, constitutes a precaution, taken prior to the fitting of the parts, against changes in shape that are not proportional to temperature.

Whereas the known hardening heat-treatment of the material having the low coefficient of thermal expansion is best carried out, in the prior art procedures, at 600° C. over a period of 24 hours, in the case of the bimetallic material in accordance with this invention, the hardening heat-treatment is optimally carried out at temperatures of 600° to 750° C. over a period of as little as 1 to 3 hours, when the material has been cold-shaped in the usual manner. If the degree of cold rolling, following the final shaping of the semi-finished products, can be increased to 50–75%, as is possible in the production of flat stamped parts of bimetallic material, then in the case of the bimetallic material in accordance with the invention, the period required for the hardening heat-treatment is reduced to 10 minutes to 2 hours in a temperature range of 550° to 750° C.

A particularly important factor as regards properties of the heat-responsive bimetallic material in accordance with the invention is the possibility, for a given degree of cold-rolling, of adjusting the duty limit of the bimetallic material over a temperature range of between 600° and 750° C. by suitably selecting the ageing or hardening heat-treatment. In the case of the known heat-responsive bimetallic materials, the duty limit for a given combination of materials depends mainly only upon the final shaping and the duration of the effect of temperature during the ageing procedure.

EXAMPLE

A heat-responsive bimetallic material in accordance with the invention having a high thermal expansion component of chromium-nickel steel containing 18% by weight of chromium and 8% by weight of nickel, and a low thermal expansion component containing 32% by weight of nickel, 14.5% by weight of cobalt, 1.6% by weight of titanium and the remainder iron, the layer-thickness ratio of the components being 1:1, was subjected to 25% reduction by cold-rolling to form a semifinished product the material of which had a specific thermal deflection of $8.8 \cdot 10^{-6}$/K, a specific electrical resistance of 0.65 $\Omega mm^2$/m, a tensile strength of 890 N/mm$^2$, a yield point of 750 N/mm$^2$, a fracture elongation of $\delta_{10}$ = 12% and a permissible bending resilience of 250 N/mm$^2$ at b 20° C. Ageing for 1 hour at 700° C. or for 3 hours at 650° C. resulted in the specific thermal defletion rising to $9.6 \cdot 10^{-6}$/K. A tensile strength of 1100 N/mm$^2$, a yield point of 900 N/mm$^2$, a fracture elongation $\delta_{10}$ = 15% and a permissible bending resilience of 500 N/mm$^2$ were recorded at 20° C. The permissible beinding resilience dropped to 350 N/mm$^2$ at 300° C., to 200 N/mm$^2$ at 500° C., to 100 N/mm$^2$ at 600° C., and to 50 N/mm$^2$ at 700° C. To establish a stable duty limit of $\leq$ 650° C., the ageing and hardening of bimetallic parts, ready for fitting, was carried out for 3 hours at 650° C., for a duty limit of 700–750° C., this treatment was carried out for 1 hour at 700° C.

By way of example, the accompanying drawing illustrates a strip 1 of heat-responsive bimetallic material, comprising a high thermal-expansion component 2 which is made of a chromium-nickel steel as in the Example, and a low thermal-expansion component 3 which is made of an iron-nickel-cobalt-titanium alloy, likewise as in the Example.

I claim:
1. A heavy-duty heat-responsive bimetallic material which comprises at least one metallic component of a material having a high coefficient of thermal expansion joined to a further metallic component of a material having a relatively low coefficient of thermal expansion, the material having a high coefficient of thermal expansion being a corrosion and heat resisting austenitic chromium-nickel steel consisting essentially of 14–26% by weight of chromium and 6–36% by weight of nickel, the remainder being iron and melt impurities and the material having the relatively low coefficient of thermal expansion being a thermally hardenable iron-nickel-titanium alloy consisting essentially of 30–55% by weight of nickel, 1–5% by weight of free titanium, the remainder being iron and melt impurities.

2. A heavy-duty heat-responsive bimetallic material which comprises at least one metallic component of a material having a high coefficient of thermal expansion joined to a further metallic component of a material having a relatively low coefficient of thermal expansion, the material having a high coefficient of thermal expansion being a corrosion and heat resisting austenitic chromium-nickel steel consisting essentially of 14–26% by weight of chromium and 6–36% by weight of nickel, the remainder being iron and melt impurities and the material having the relatively low coefficient of thermal expansion being a thermally hardenable iron-nickel-cobalt-titanium alloy consisting essentially of 26–39% by weight of nickel, 3–16% by weight of cobalt, 1–5% by weight of free titanium, the remainder being iron and melt impurities.

3. A heavy-duty heat-responsive bimetallic material according to claim 2 wherein the material having a high coefficient of thermal expansion is a corrosion and heat resisting austenitic chromium-nickel-steel consisting essentially of 18% by weight of chromium and 8% by weight of nickel, the remainder being iron and melt impurities and the material having the relatively low coefficient of thermal expansion is a thermally hardenable iron-nickel-cobalt-titanium alloy consisting essentially of 32% by weight of nickel, 14.5% by weight of cobalt, 1.6% by weight of titanium and the remainder iron.

4. A bimetallic material according to claim 2 wherein the material having the high coefficient of thermal expansion is a chromium-nickel steel having 18% by weight of chromium and 8% by weight of nickel, the remainder being iron, and the material having the low coefficient of thermal expansion is a thermally hardenable iron-nickel-cobalt-titanium alloy containing 34% by weight of nickel, 6% by weight of cobalt, 1.5% by weight of free titanium and up to 0.03% by weight of carbon, the remainder being iron.

* * * * *